US006206449B1

United States Patent
Searfoss

(10) Patent No.: US 6,206,449 B1
(45) Date of Patent: Mar. 27, 2001

(54) SIDE-TO-SIDE TRUCK COVER SYSTEM

(76) Inventor: Timothy K. Searfoss, 1282 E. M-55, West Branch, MI (US) 48661

( * ) Notice: Subject to any disclaimer, the term of this patent is extended or adjusted under 35 U.S.C. 154(b) by 0 days.

(21) Appl. No.: 09/510,588

(22) Filed: Feb. 22, 2000

(51) Int. Cl.$^7$ ..................................................... B60J 11/00
(52) U.S. Cl. ........................................ 296/98; 296/100.14
(58) Field of Search ................................ 296/98, 100.14

(56) References Cited

U.S. PATENT DOCUMENTS

| | | |
|---|---|---|
| 4,302,043 | 11/1981 | Dimmer . |
| 4,659,134 * | 4/1987 | Johnson ................................ 296/98 |
| 4,673,208 * | 6/1987 | Tsukamoto ...................... 296/100.14 |
| 4,691,957 * | 9/1987 | Ellingson ............................... 296/98 |
| 4,834,445 * | 5/1989 | Odegaard .............................. 296/98 |
| 4,915,439 * | 4/1990 | Cramaro ................................ 296/98 |
| 4,991,901 | 2/1991 | Meekhof, Sr. . |
| 5,002,328 * | 3/1991 | Michel .................................. 296/98 |
| 5,050,923 | 9/1991 | Petelka . |
| 5,180,203 * | 1/1993 | Goudy ................................... 296/98 |
| 5,186,231 | 2/1993 | Lewis . |
| 5,211,441 * | 5/1993 | Barkus et al. ......................... 296/98 |
| 5,288,123 | 2/1994 | Dimmer . |
| 5,328,228 * | 7/1994 | Klassen ........................... 296/100.14 |
| 5,429,403 | 7/1995 | Brasher . |
| 5,487,584 | 1/1996 | Jespersen . |
| 5,549,347 * | 8/1996 | Anderson ............................... 296/98 |
| 5,765,901 * | 6/1998 | Wilkens ................................ 296/98 |
| 5,806,911 * | 9/1998 | Haddad ........................... 296/100.14 |
| 5,829,819 | 11/1998 | Searfoss . |
| 5,887,937 | 3/1999 | Searfoss . |
| 5,924,758 | 7/1999 | Dimmer . |
| 5,938,270 | 8/1999 | Swanson . |
| 5,944,374 * | 8/1999 | Searfoss .......................... 296/100.14 |

* cited by examiner

Primary Examiner—Joseph D. Pape
Assistant Examiner—Kiran B. Patel
(74) Attorney, Agent, or Firm—Brooks & Kushman P.C.

(57) ABSTRACT

An apparatus is disclosed for extending and retracting a cover over a bed of a truck. The apparatus comprises a pair of arms and a motor. A main arm includes a first base and a first extension, the first base being pivotal across at least a portion of the rear of the truck bed, and the first extension being pivotally connected to the first base. A bearing arm includes a second base and a second extension, the second base being pivotal across at least a portion of the front of the truck bed, and the second extension being pivotally connected to the second base. The motor is mounted on the main arm, and selectively extends and retracts the cover over the truck bed.

21 Claims, 3 Drawing Sheets

SIDE-TO-SIDE TRUCK COVER SYSTEM

TECHNICAL FIELD

This invention relates to covers for truck beds, and more particularly to a side-to-side truck cover system.

BACKGROUND ART

Many trucks, particularly those hauling loose loads such as sand and gravel, need a truck cover to prevent the wind from blowing load particles off the load bed. Various apparatus have been devised for covering a truck load. Some such apparatus include a motor for selectively winding a flexible cover. An effective truck cover should be one which is easily operated by the truck driver so as to selectively cover and uncover the truck bed from the convenient location of the truck cab.

My U.S. Pat. No. 5,031,955 provides a truck cover which may be conveniently motor operated from the cab of a truck to extend the cover from a winding assembly proximate the front of the truck bed and forward the rear of the truck bed. My '955 patent is hereby incorporated by reference. A need also exists for systems that cover the truck bed from side to side. For instance, U.S. Pat. No. 5,328,228 shows a cover for truck bed and cargo. Similarly, U.S. Pat. No. 5,924,758 shows a roll assist mechanism for tarp systems.

DISCLOSURE OF INVENTION

The present invention is an apparatus for covering a truck bed having a front, two sides and a rear. The apparatus comprises two arms and a motor. A first arm includes a first base and a first extension. The first base is pivotal across at least a portion of the rear of the truck bed, and the first extension is pivotally connected to the first base. The motor drives a reel extending between the arms.

Accordingly, an object of this invention is to provide an apparatus of the type described above which covers the bed of a truck from side to side.

Another object of this invention is to provide an apparatus of the type described above which provides selective, powered control over covering and uncovering the load bed.

Still another object of this invention is to provide an apparatus of the type described above which permits a side dump truck to dump in either direction when the cover is retracted.

These and other objects, features, and advantages of the present invention are readily apparent from the following detailed description of the best mode for carrying out the invention when taken in conjunction with the accompanying drawings.

BEST MODE FOR CARRYING OUT THE INVENTION

Figure 1:
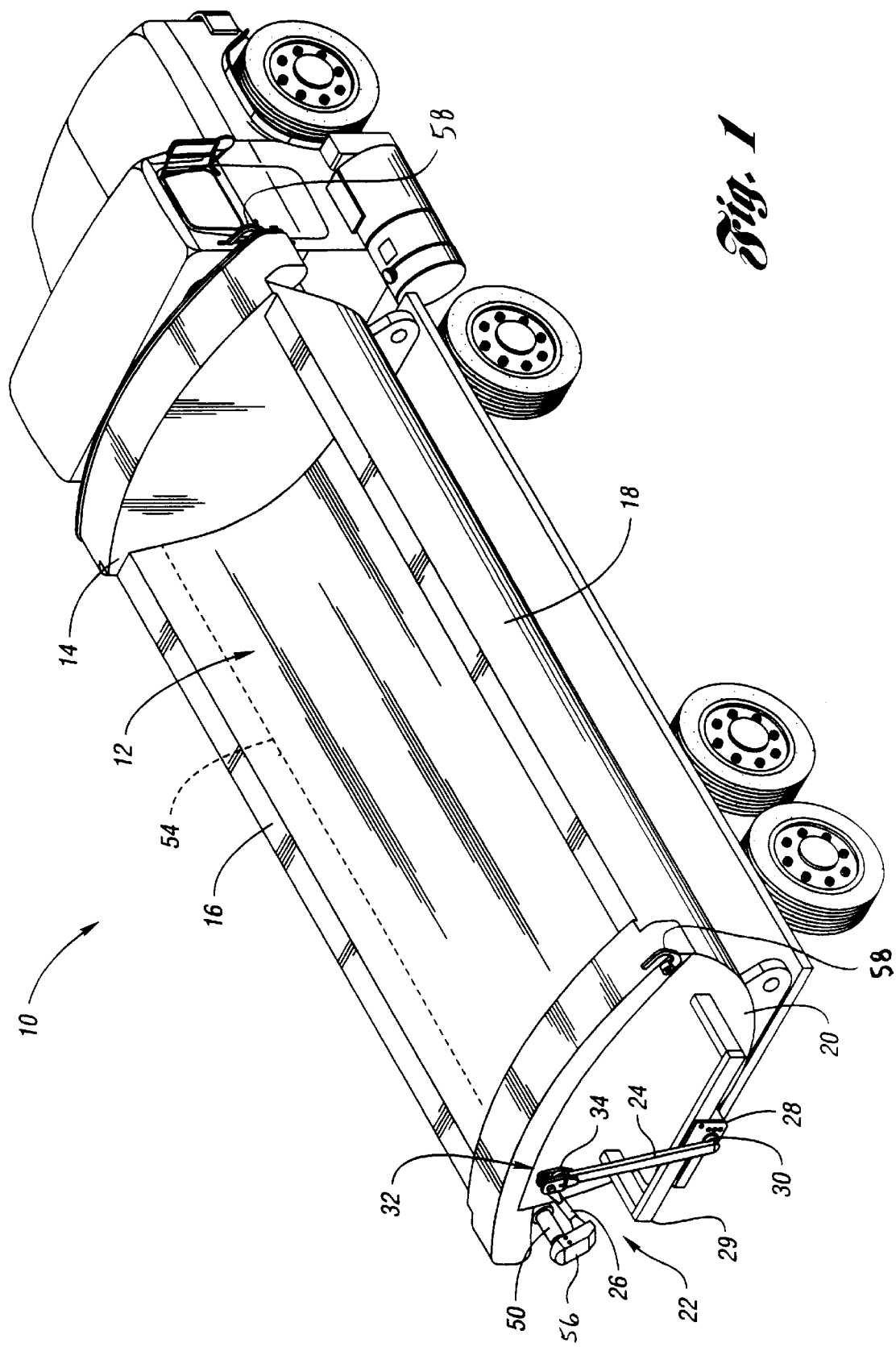
FIG. 1 is a perspective view of a truck including an apparatus according to the present invention for covering a bed of the truck.

With reference to the drawings, the preferred embodiments of the present invention will be described. FIG. 1 shows an apparatus 10 according to the present invention for covering a bed 12 of a truck having a front 14, two sides 16 and 18, and a rear 20. The apparatus 10 comprises a main arm 22 including a base 24 and an extension 26.

The base 24 is mounted at a base plate 28 so as to be pivotal across at least a portion of the rear 20 of the truck bed. In some instances, the base plate 28 may be mounted in turn on an adaptor bracket 29. The base plate 28 includes at least one spiral torsion spring 30. Preferably, one end of each of the springs 30 engages a groove formed in the surface of and extending a substantial portion of the length of a center shaft, while the other ends of the springs cooperate with a locator pin. Further details of this arrangement are taught by U.S. Pat. No. 5,887,937, which is hereby incorporated by reference. In this way, the base 24 is normally biased clockwise as shown through an intermediate position shown in FIG. 2 and toward a covered, deployed position shown in FIG. 3.

The extension 26 is pivotally connected to the base 24 by a hinge or knuckle 32. Preferably, a knuckle shaft is welded or otherwise fixed to one of a pair of plates extending from an upper end of the base 24. The knuckle shaft extends through a similar pair of plates extending from the lower end of the extension 26 such that the knuckle shaft is rotatable with respect to the extension. One end of each of a plurality of spiral torsion springs 34 preferably engages an axial groove formed in the knuckle shaft. The other ends of the springs 34 cooperate with a knuckle locator pin. Further details of this arrangement are taught by U.S. Pat. No. 5,944,374, which is hereby incorporated by reference. In this way, the extension 26 is biased clockwise as shown with respect to the free end of the base 24.

A second or bearing arm 40 similarly includes a base 42 pivotal across at least a portion of the front 14 of the truck bed, and an extension 44 pivotally connected by a knuckle 46 to the bearing arm base 42. A reel 50 extends between distal ends of the extensions 26 and 44. The reel 50 is rotatable, and functions as a take-up spool for one end of a flexible tarp or cover 52. The other end of the cover 52 is clamped, riveted, or otherwise fixed at one or more points along a line 54 below the top of the side 16 of the truck. In the fully uncovered position shown in FIG. 1, the cover 52 is wound on the reel 50, which in turn rests near the line 54. With the apparatus 10 in this position, the truck bed may dump in either the clockwise or counterclockwise direction without interference from the retracted cover.

A motor 56 is mounted on the distal end of either the arm 44 or, more preferably as shown, on the distal end of the arm 26. The motor 56 is operatively connected to the reel 50 and can be energized, from within or without the cab of the truck, to rotate the reel 50 and wind up the cover 52. When energized, the motor 56 drives the reel 50 to retract the cover 52 against the tension force of the springs and uncover the load bed. Further details of one embodiment of the motor are taught by U.S. Pat. No. 5,829,819, which is hereby incorporated by reference.

Figure 2:
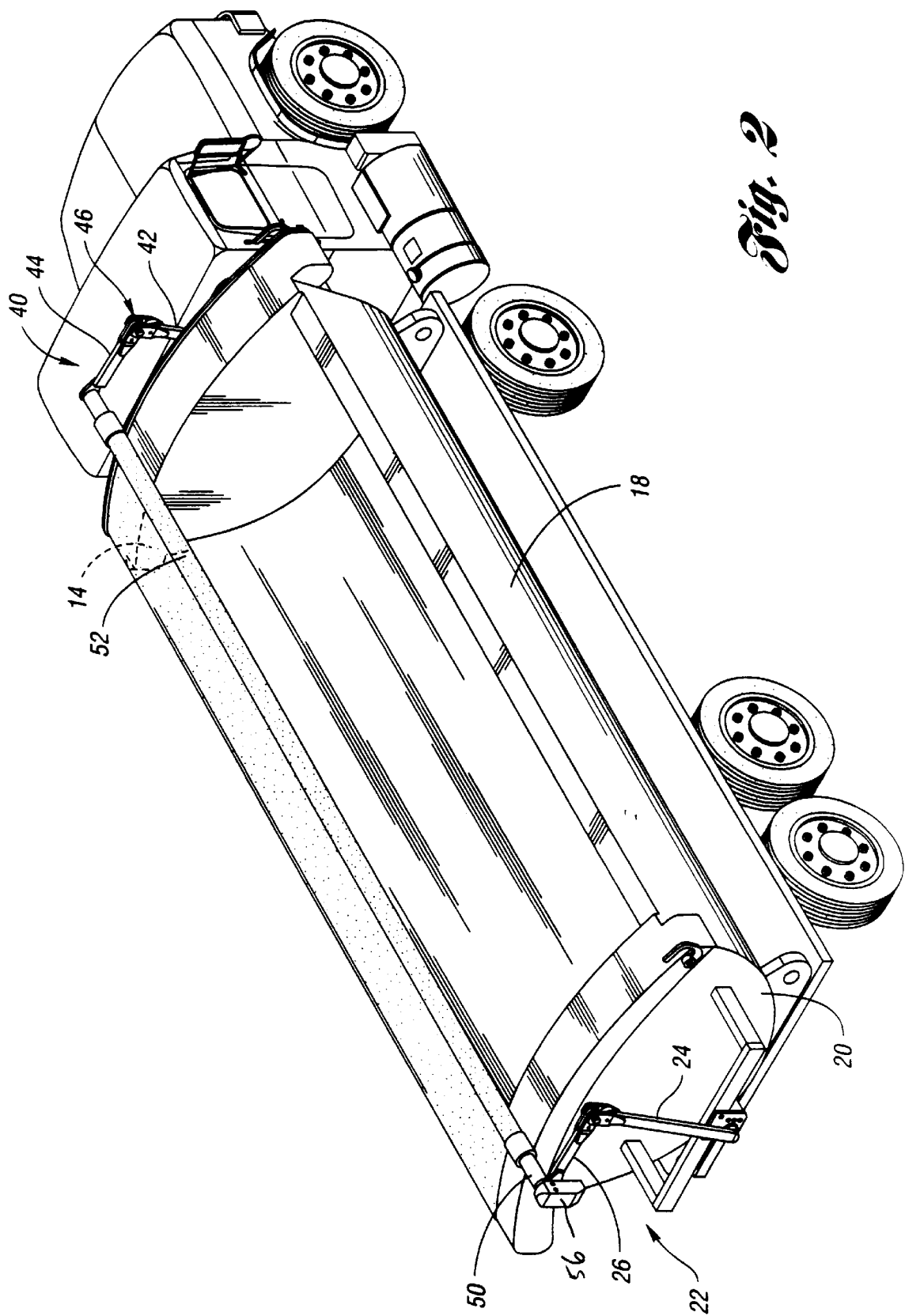
FIG. 2 is a perspective view of the truck showing a cover in a partially deployed position.
Figure 3:
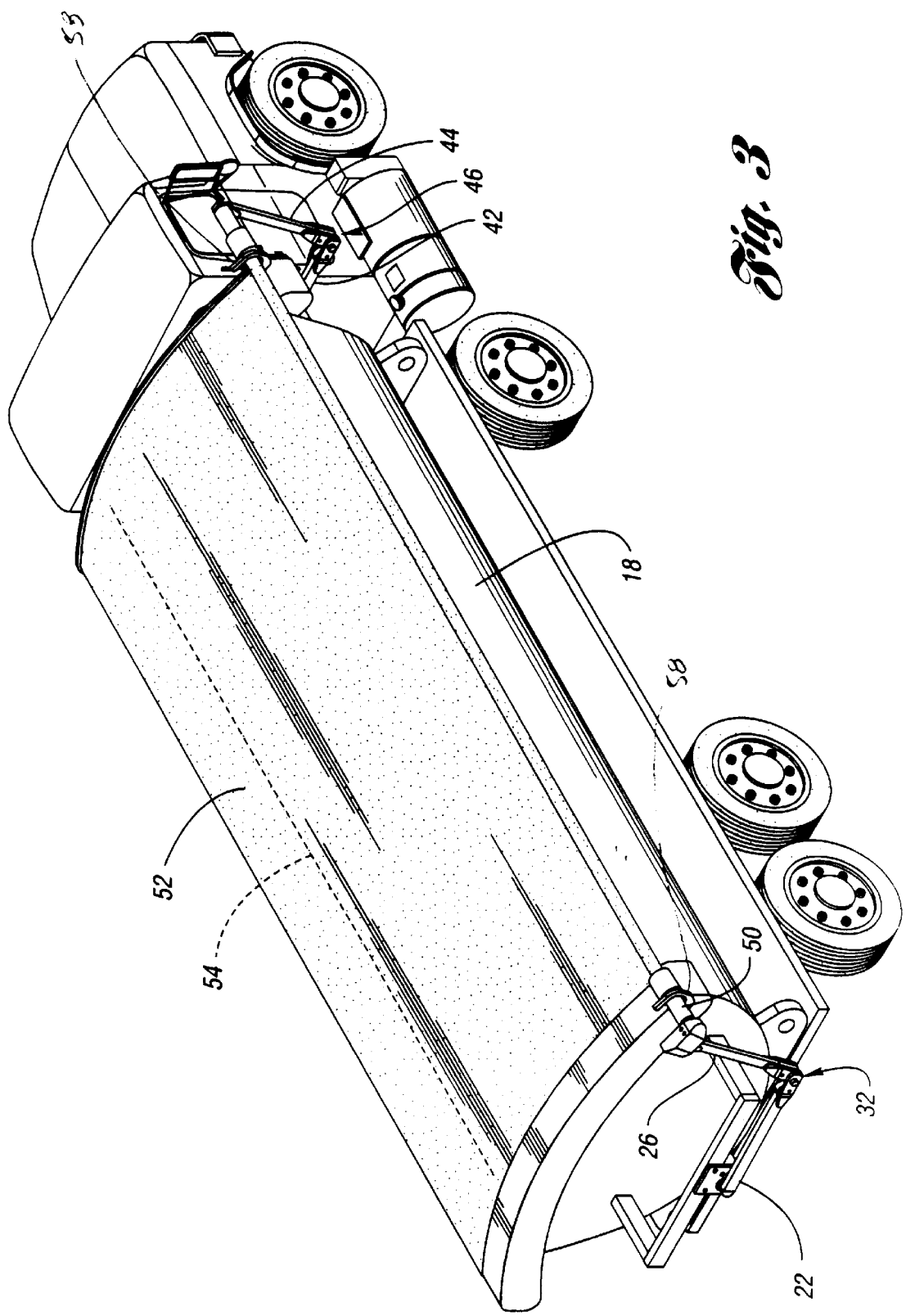
FIG. 3 is a perspective view of the truck showing the cover in a deployed position.

When the motor 56 is not energized, and a brake is released, the arms 22 and 40 swing toward the right side 18 of the truck bed as shown in FIGS. 2 and 3. The cover 52 is then pulled off of the reel 50 and extended over the load bed. As the bases 24 and 42 are biased toward the right side 18 of the truck, the knuckle springs also bias the extensions 26 and 44 toward the right side of the truck so as to hold the cover 52 in tension. One or more hooks 58 provide a positive stop to engage the reel 50 and prevent over extension. Alternatively, stops can be provided for the base(s) and/or the extension(s). Rotation of the extensions 26 and 44 relative to their respective bases is normally in the range of about 30 to 40 degrees. In still another alternative embodiment, the arms 22 and 44 are permitted to rotate to a position proximate the right side 18 roughly equivalent to the position 54. In this position, the cover 52 is clamped, i.e. the reel 50 is tucked below the top of the right side 18 of the truck.

By varying the position of the locator pins, the number of springs and/or the spring constant of the springs, the forces biasing the bases and the extensions toward the deployed position are variable. In a preferred embodiment, six springs are used in base of main arm 22, three springs in the main knuckle 32, five springs in the bearing base, and 2 springs in the bearing knuckle 46. In this arrangement the knuckles 32 and 46 open more quickly than the bases 24 and 42 rotate, thus accommodating the weight of the motor 56 and allowing the motor to swing from its place proximate the position 54 and clear the top edge of the side 16 of the truck.

It should be understood that while the forms of the invention shown and described above constitute preferred embodiments of the invention, they are not intended to illustrate all possible forms thereof. For example, the invention may be utilized on both flat truck beds and those having raised sides as illustrated. It should also be understood that the words used are words of description rather than limitation, and various changes may be made without departing from the spirit and scope of the invention disclosed.

What is claimed is:

1. An apparatus for covering a truck bed having a front, two sides and a rear, the apparatus comprising:
    a first arm including a first base and a first extension, the first base having a pivotal end pivotable about a fixed position on the truck bed intermediate the sides of the truck bed and a distal end sweeping across at least a portion of the rear of the truck bed, and the first extension having a proximate end being pivotally connected to the first base distal end and a distal end spaced therefrom;
    a spiral torsion spring cooperating with the first base pivotal end to rotationally bias the first base toward a deployed position;
    a second arm;
    a reel extending between the first and second arms; and
    a motor mounted on one of the first or second arms and drivingly engaged with the reel.

2. The apparatus of claim 1 wherein the second arm includes a second base and a second extension, the second base being pivotal across at least a portion of the front of the truck bed, and the second extension being pivotally connected to the second base.

3. The apparatus of claim 1 wherein the reel extends between distal ends of the first and second extensions.

4. The apparatus of claim 1 further comprising a cover connected to the reel and adapted to be wound thereon.

5. The apparatus of claim 2 further comprising at least one spring cooperating with the second base to bias the second base toward the deployed position.

6. The apparatus of claim 5 wherein the at least one spring comprises a spiral torsion spring.

7. The apparatus of claim 5 wherein the at least one spring engages the base.

8. The apparatus of claim 1 further comprising at least one spring, cooperating with the first or second extension to bias that extension toward a deployed position.

9. The apparatus of claim 8 wherein the at least one spring comprises a spiral torsion spring.

10. The apparatus of claim 8 wherein the at least one spring engages the extension.

11. An apparatus for extending and retracting a cover over a bed of a truck, the truck bed having a front, two sides and a rear, the apparatus comprising:
    a first arm including a first base and a first extension, the first base being pivotal from a position intermediate the sides of the truck bed and across at least a portion of the rear of the truck bed, and the first extension being pivotally connected to the first base;
    a spiral torsion spring cooperating with the first base to bias the first base toward a deployed position;
    a second arm including a second base and a second extension, the second base being pivotal across at least a portion of the front of the truck bed, and the second extension being pivotally connected to the second base; and
    a motor mounted on the first extension and connected to the cover to selectively extend and retract the cover over the truck bed.

12. The apparatus of claim 11 further comprising a reel extending between the first and second arms.

13. The apparatus of claim 11 further comprising a reel extending between distal ends of the first and second extensions.

14. The apparatus of claim 12 wherein the cover is connected to the reel and adapted to be wound thereon.

15. The apparatus of claim 11 further comprising at least one spring cooperating with the second base to bias the second base toward the deployed position.

16. The apparatus of claim 15 wherein the at least one spring comprises a spiral torsion spring.

17. The apparatus of claim 15 wherein the at least one spring engages the base.

18. The apparatus of claim 11 further comprising at least one spring cooperating with the first or second extension to bias that extension toward a deployed position.

19. The apparatus of claim 18 wherein the at least one spring comprises a spiral torsion spring.

20. The apparatus of claim 18 wherein the at least one spring engages the extension.

21. An apparatus for extending and retracting a cover over a bed of a truck, the truck bed having a front, two sides and a rear, the apparatus comprising:
    a first arm including a first base and a first extension, the first base being pivotal from a position intermediate the sides of the truck bed and across at least a portion of the rear of the truck bed, and the first extension being pivotally connected to the first base;
    at least one spiral torsion spring cooperating with the first base to bias the first base toward a deployed position;
    at least one spiral torsion spring cooperating with the first extension to bias the first extension toward a deployed position;
    a second arm including a second base and a second extension, the second base being pivotal across at least a portion of the front of the truck bed, and the second extension being pivotally connected to the second base;
    a reel extending between distal ends of the first and second extensions, the cover being connected to the reel and adapted to be wound thereon; and
    a motor mounted on one of the base or the extension, the motor being connected to the reel to selectively extend and retract the cover over the truck bed.

* * * * *